United States Patent Office 3,629,217
Patented Dec. 21, 1971

3,629,217
PROCESS AND APPARATUS FOR THE CONTINUOUS PREPARATION OF A SPINNABLE SOLUTION OF ACRYLONITRILE POLYMERS
Georges Balitrand, Caluire, and Andre Mison, Jean Roget, and Philippe Tarbouriech, Lyon, France, assignors to Rhone-Poulenc S.A., Paris, France
Filed July 28, 1969, Ser. No. 845,297
Claims priority, application France, July 30, 1968, 161,208
Int. Cl. C08f 3/76; B01j 1/00
U.S. Cl. 260—88.7                 6 Claims

ABSTRACT OF THE DISCLOSURE

Polyacrylonitrile solutions suitable for spinning are advantageously produced by solution polymerisation in a reactor having an axial shaft carrying discs separating the reactor into separate reaction zones, turbines for stirring the zones separately, and scrapers for the upper part of the reactor.

---

Figure 1:
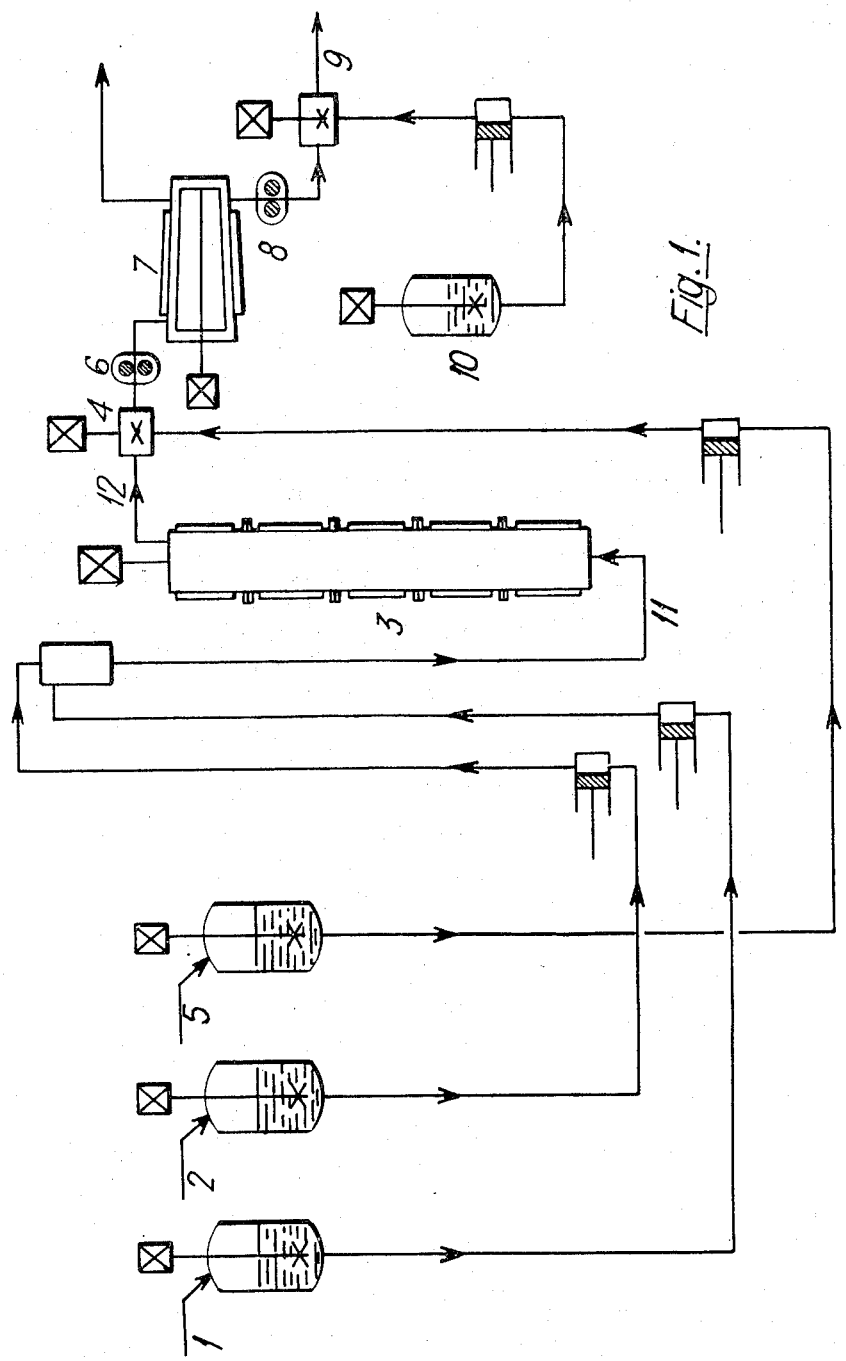

The present invention relates to the continuous polymerisation of acrylonitrile on its own, or with other copolymerisable monomers to produce directly spinnable polymer solutions, and to apparatus for use therein.

By "acrylonitrile polymers" are meant polymers which are obtained by homopolymerisation of acrylonitrile or by copolymerisation of acrylonitrile with other monomers and which are soluble in the polymerisation solvent. The latter can be dimethylformamide, dimethylsulphoxide, ethylene carbonate or any other solvent that is suitable for use in processes of spinning acrylonitrile polymers.

Various processes for polymerising acrylonitrile continuously in a solvent medium have been proposed, the solvents being solvents both for acrylonitrile and for its polymers, notably dimethylformamide, dimethylsulphoxide, and ethylene carbonate. The object of these processes is to obtain spinnable solutions of polymer directly from the monomer. These polymers must have constant and homogeneous properties to give good quality yarns. It is known that the uniformity of these properties depends on various factors such as the thickening of the reaction medium and the evolution of heat. Rigorous control of these factors is therefore necessary. To this end various devices have been proposed such as the use of cascade reactors equipped with individual stirring, to each of which solvent is added to dilute the solution which is obtained in the preceding reactor and which thickens as the polymerisation progresses. The use of tubular reactors has also been proposed, not equipped with stirrers but with internal cooling elements to improve the heat exchange and the control of polymerisation. But the multiplicity of the number of stirred reactors or the presence of cooling systems in the interior of the non-stirred polymerisation apparatus are not technically favourable solutions for the manufacture of polyacrylonitrile on a large scale.

It has now been found that it is possible to obtain, using a special, novel form of reactor, solutions of acrylonitrile polymers which make it possible to obtain high quality yarns, by means of a device of high productivity, and under conditions of concentration of the monomers, of temperature, of degree of conversion and of duration, which are compatible with the requirements of production on an industrial scale.

The present invention provides a reactor for continuous solution polymerisation comprising an upright, substantially cylindrical reactor, in two sections, means for feeding monomer, polymerisation catalyst, and polymer solvent to the lower part of the first section, means for feeding the product from the upper part of the first section to the lower part of the second section, means for withdrawing polymer solution from the upper part of the second section, and a shaft mounted for rotation substantially axially within each section and carrying in the first section a plurality of discs defining separate but intercommunicating reaction zones within said section, and a plurality of turbines, at least one such turbine being within each of the said reaction zones, and in the second section, one or more scrapers scraping the internal walls of the said reactor. The two sections of the reactor may be mounted one above the other and have a common axial shaft, or they may be separate and each have its own axial shaft. Using this reactor, spinnable solutions of acrylonitrile polymers are continuously prepared by feeding monomer, polymerisation catalyst, and polymer solvent to a reactor of the invention to produce a solution containing at least 20% by weight of monomer, maintaining a temperature of 40° to 80° C. throughout the reactor, rotating the axial shaft or shafts in the two sections of the said reactor to cause the reaction mixture to pass therethrough, withdrawing polymer solution from the reactor, diluting the said solution, and removing unpolymerised monomer therefrom.

The process and apparatus of the invention will be further described with reference to the accompanying drawings which show schematically an appropriate device for carrying out the invention.

FIGURE 1 shows a schematic drawing of the three essential stages of the process, that is to say polymerisation in the reactor 3 of monomers in solution introduced through tube 11, then the removal through 12 of the polymerised solution and its dilution in 4, as it leaves the polymeriser, and finally the elimination of unconverted volatile monomers by means of a thin film evaporator 7.

Further, it may be necessary to adjust the viscosity of the solution, to satisfy the rigorous spinning requirements, by addition of solvents when it issues from the evaporator. However this addition of solvent is not indispensable if the viscosity is correct at the exit of the evaporator, which can readily be achieved with an evaporator equipped with a device for controlling and regulating the viscosity, which acts directly on the running conditions of the evaporator.

Figure 2:
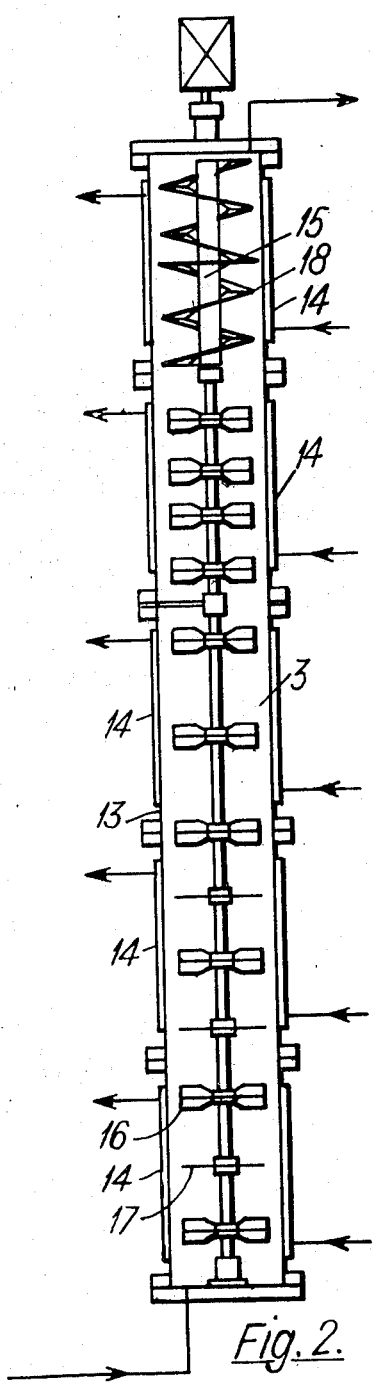

FIG. 2 shows, in cross-section in a vertical axial plane, one embodiment of the reactor of the invention. The reactor consist of a vertical column 13 in which the ratio of height to diameter can vary between 4 and 20, preferably from 6 to 15. The heat exchange jackets 14, which can be individually regulated, allow the temperature of the reactor to be controlled along the whole length. The body of the column is filled over its entire height by an axial stirring system made up of the shaft 15 bearing turbines 16 and horizontal discs 17 whose diameter is slightly less than the interior diameter of the column, so that the reaction mixture may pass along. As shown in this figure the spacing of the discs may progressively increase towards the upper part of the column, and the number of turbines per zone defined by the discs may correspondingly increase. These discs and turbines are distributed over about ⅘ of the height of the shaft starting from the end nearest to the inlet of the reagents and their number can vary from 2 to 20, preferably from 3 to 15.

The remaining part of the shaft carries a stirring system 18 made up of two spiral strips of opposite pitch which scrape the internal walls of the column. The reagents undergo efficient stirring from their introduction into the polymeriser and, because of the presence of the discs in the zone where the product is of low viscosity, and of the grouping together of the turbines to increase the efficiency of stirring where the medium is more viscous, these reagents progress without the possibility either of returning backwards or of going forward too fast, while polymerisation occurs. Thus these discs and turbines define successive individual stirred reaction zones within the polymeriser itself, so that a concentration gradient is maintained, allowing an increase in the overall polymerisation speed relative to a perfectly stirred reaction vessel of the same volume.

In consequence of this, a viscosity gradient of the solution is also obtained which facilitates heat exchanges and the control of the polymerisation. In other words, the discs and the stirring turbines can be said to define successive "autonomous" blocks of polymerisation, along which polymerisation proceeds progressively to the required degree of conversion, thus producing a solution with a suitable viscosity for it to be drawn off without difficulty.

Figure 3:
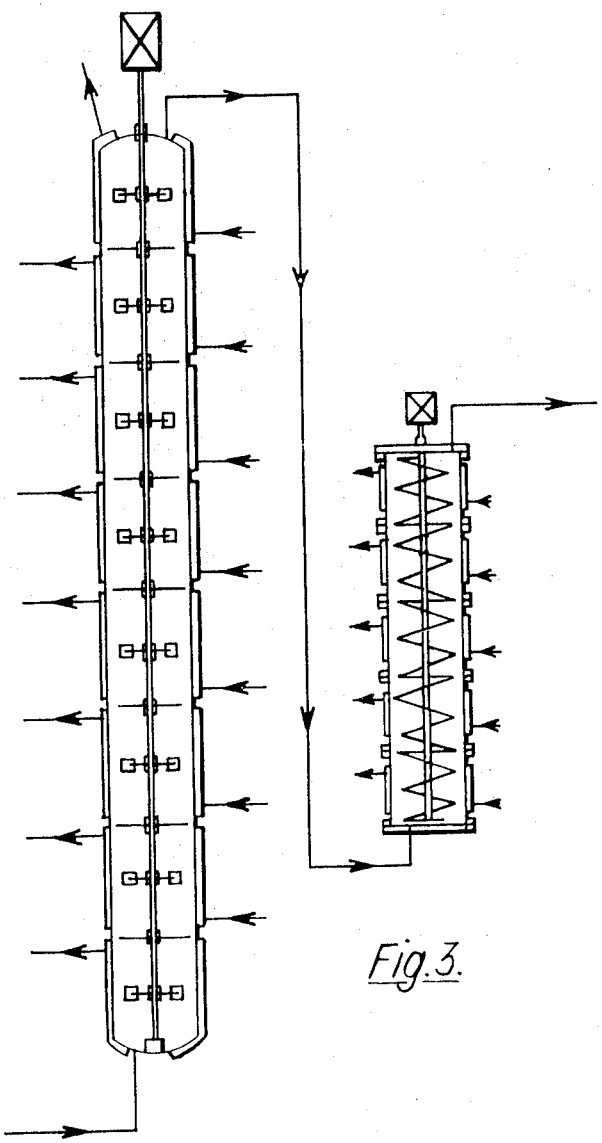

For a large production capacity it is difficult to achieve stirring rates in one and the same polymeriser that are suitable for the different viscosities of the reaction mixture; it is therefore preferable to separate it into 2 or more reactors mounted in series, as for example in FIG. 3, in order to achieve different stirring speeds.

In this type of reactor, whether it is a single unit as in FIG. 2 or separated as in FIG. 3, it is possible to polymerise solutions having a concentration of monomers which may be as high as 50% and still to do so with a relatively high degree of conversion, because of the efficiency of stirring. Under these conditions a highly viscous reaction mixture is obtained at the outlet of the polymeriser, from which it is difficult to separate all the residual volatile monomers. It is then necessary to dilute the mixture as it leaves the polymeriser by adding to it a certain quantity of solvent, before carrying out the distillation to remove the monomers. The addition of solvent at this stage of the process has the advantage, moreover, of considerably reducing the progressive change in the reaction mixture, and optionally allows the addition of various adjuvants which may improve the quality of the yarns. The quantity of solvent that it is necessary to add is a function of the degree of conversion of the monomers and of the quantity of residual volatile monomers acceptable in the spinning solution.

EXAMPLE 1

The apparatus used for this experiment is shown in FIG. 1. The polymeriser 3 is shown in detail in FIG. 2; it has a capacity of 120 litres and its height is 10 times its diameter. The rotation speed of the stirring shaft is 73 r.p.m. In reservoir 1 is a mixture of 96.5% by weight of acrylonitrile and of 3.5% of methyl methacrylate, and in reservoir 2 a solution containing 98.5% by weight of dimethylformamide, 1.07% by weight of potassium p-vinyloxy-benzene-sulphonate and 0.43% of azo-bis-isobutyronitrile. The mixtures contained in reservoirs 1 and 2 are fed continuously through 11 into the reactor, previously purged with nitrogen, at a rate of 2472 g./hr. and 4754 g./hr. respectively. The time the reagents remain in the polymeriser is thus 15 hours. The polymerisation medium is maintained at 50° C. along the entire length of the reactor by means of fluid circulating in each of the five separate double jackets which the apparatus comprises. A degree of conversion of monomer of 67% and a solution viscosity of about 500 poises was determined in samples taken at the outlet of the polymeriser after 30 hours running.

The polymer contains 5.18% by weight of methyl methacrylate and 74 milliequivalents of sulphonate groups per kg. of polymer. The specific viscosity of the polymer, measured at 25° C. on a solution of 2 g. of polymer per litre of dimethylformamide, is 0.355. Samples taken regularly subsequently during the course of a continuous 250 hours run give effectively the same results, thus showing the remarkable uniformity of the polymerisation.

At the exit of the polymeriser, the products are passed to the diluter 4, which is of small volume and intensively stirred, where they are diluted with dimethylformamide containing 8% of water and dispensed from reservoir 5 at a rate of 3674 g./hr. The solution diluted in this way is pumped uniformly by means of a gear pump 6 into a horizontal film evaporator 7 working at a reduced pressure of 100 mm. of mercury absolute, to eliminate residual volatile monomers at the same time as dimethylformamide. The flow of distillate is 3550 g./hr. and that of the concentrated solution 7350 g./hr., on average. The solution, which is withdrawn from the evaporator by a gear pump 8, contains less than 1% of volatile monomers. The viscosity of the solution is adjusted to 400 poises by means of dimethylformamide coming from the reservoir 10 with the aid of a diluter, of small volume and intensively stirred. The solution is then spun directly into an aqueous coagulating bath containing 40% dimethylformamide at a temperature of 5° C. The yarns which are obtained after stretching and stabilisation have a gauge per strand of 4 decitex, a breaking strength of 30.6 g./tex and an elongation at break of 33.6%, values which are similar to those found for yarns made of a polymer derived from polymerisation in aqueous suspension of identical mixtures of monomers.

Moreover the whiteness of the yarns obtained in this way is superior to that of yarns of equivalent polymers prepared in aqueous suspension. The following figures show that it is not necessary to add a colour stabiliser before spinning:

| | Percent | | |
| --- | --- | --- | --- |
| | Degree of whiteness | Purity | Luminosity |
| Polymerisation in dimethyl-formamide without stabilisation | 94.6 | 5.4 | 82.6 |
| Polymerisation in water with oxalic acid as the colouring stabiliser | 94.6 | 5.4 | 81.8 |

In comparison with yarns of similar polymers prepared from aqueous suspension, the dyeing affinity of the yarns obtained from solutions from the present process is greater for cationic dyestuffs, and is the same for disperse dyestuffs.

EXAMPLE 2

As in Example 1, a solution of acrylonitrile/methyl methacrylate containing 4.35% of methyl methacrylate is fed continuously into the reactor at a rate of 2768 g./hr., together with 4410 g./hr., of a solution of dimethylformamide containing 0.7% of sodium allyl-sulphonate and 0.063% of azo-bis-isobutyronitrile. The dwell time in the polymeriser is thus 15 hours. The temperature of polymerisation is regulated to 62° C.

During a continuous 100 hour run, a degree of conversion of 55% was found (this corresponds to a productivity effectively equivalent to that of Example 1). The polymer contains on average 77 milliequivalents of sulphonate per kg. of polymer and 7.1% of methyl methacrylate. It has a specific viscosity of 0.337. The viscosity of the solution is approximately 500 poises at 20° C.

The solution is diluted with 4372 g./hr., of pure dimethylformamide before passing it to the distillation. The flow of distillate is on average 4700 g./hr., and that of the concentrated solution 6850 g./hr. The residual volatile monomer content of this solution is less than 1%.

As in Example 1, the solution is diluted to the required viscosity, and then spun under identical conditions to those of Example 1. After stretching and stabilising, fibres of 3.3 d.tex/strand having a tenacity of 24 g./tex and an elongation of 25% are obtained, having a good dyeing affinity for basic dyestuffs.

We claim:

1. Process for the continuous preparation of a spinnable solution of polyacrylonitrile which comprises feeding monomer, polymerisation catalyst, and polymer solvent to the lower part of the first section of an upright, substantially cylindrical reaction having a lower, first section and, immediately above, an upper, second section, feeding the product from the upper part of the first section to the lower part of the second section, discharging polymer solution from the upper part of the second section, diluting the said solution and removing unpolymerised monomer therefrom to produce the said spinnable solution, the said solution being maintained at a temperature of 40° to 80° C., throughout, and rotating within both sections a substantially axial common shaft carrying, in the lower, first section, a plurality of discs defining separate and intercommunicating reaction zones within said section without contacting the internal walls thereof, and a plurality of turbines, at least one such turbine rotating within each of the said reaction zones, and, in the upper, second section, scrapers which contact and scrape the internal walls of the said reactor.

2. A reactor for continuous solution polymerisation comprising an upright, substantially cylindrical reactor having a lower, first section and, immediately above, an upper, second section, means for feeding monomer, polymerisation catalyst, and polymer solvent to the lower part of the first section, means for feeding the product from the upper part of the first section to the lower part of the second section, discharge means for withdrawing polymer solution from the upper part of the second section, and a common shaft mounted for rotation substantially axially within both sections and carrying in the lower, first section, a plurality of discs defining separate but intercommunicating reaction zones within said section without contacting the internal walls thereof, and a plurality of turbines, at least one such turbine being within each of the said reaction zones, and, in the upper, second section one or more scrapers contacting and scraping the internal walls of the said reactor.

3. A reactor according to claim 2 in which the lower, first section takes up about four fifths of the total height of the reactor and the discs and turbines therein vary in number from 3 to 15.

4. A reactor according to claim 2 in which the spacing of the discs increases progressively towards the upper part of the said lower first section, and the number of turbines per reaction zones also increases towards the upper part of the said lower first section.

5. A reactor according to claim 2 in which the scrapers consist of one or more spiral strips.

6. A reactor according to claim 2 in which the ratio of the total height to the diameter is from 6 to 15.

References Cited

UNITED STATES PATENTS

| | | | |
|---|---|---|---|
| 2,931,793 | 4/1960 | Melchore | 260—95 X |
| 3,361,537 | 1/1968 | Ferrante | 23—285 X |
| 3,363,994 | 1/1968 | Brooks et al. | 23—283 X |
| 3,380,976 | 4/1968 | Izumi et al | 260—85.5 |

JAMES H. TAYMAN, JR., Primary Examiner

U.S. Cl. X.R.

23—283, 285, 260; 260—95; 159—25A; 165—94, 109; 259—8, 96, 107